United States Patent Office 3,567,761
Patented Mar. 2, 1971

3,567,761
OXALIC ACID SALTS OF N-DIALKYLAMINO-ETHYL-α-(NAPHTHYL - 1) DELTA-PENT-4-ENOIC ACID
Etienne Szarvasi, Ecully, and Michel Bayssat, Lyon, France, assignors to Lipha, Lyonnaise Industrielle Pharmaceutique
No Drawing. Original application Mar. 18, 1964, Ser. No. 352,963, now Patent No. 3,334,096, dated Aug. 1, 1967. Divided and this application Apr. 3, 1967, Ser. No. 627,682
Int. Cl. C07c 69/76
U.S. Cl. 260—469  3 Claims

ABSTRACT OF THE DISCLOSURE

Acid salts of esters of α-(1-naphthyl)-delta-pent-4-enoic acid are obtained by the reaction of the acid with an amino derivative of the formula

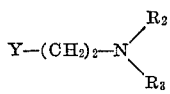

wherein $R_2$ and $R_3$ are lower alkyl radicals and Y is selected from the group consisting of the halogens and the hydroxy radical to obtain esters of the formula

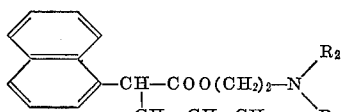

which can then be converted to the acid salts.

---

This application is a divisional application of application Ser. No. 352,963 filed Mar. 18, 1964, now U.S. Patent No. 3,334,096.

The present invention relates to new nitrogenous bases substituted by at least one naphthyl or naphthyl-methyl radical, and particularly to a new series of amino esters and their acid salts which are thus substituted.

The N-diethylamino ethyl beta-(1-naphthyl)-beta'-tetrahydrofuryl isobutyrate, endowed with antispasmodic properties has formed the subject of the U.S. patent application No. 308,662 of Sept. 13, 1963, now abandoned.

Certain new amino esters and their acid salts, endowed with very interesting antispasmodic properties, have been discovered according to the invention. These compounds are the members of the class which consists in their free bases, their acid salts and their quaternary ammonium derivatives, of the compounds represented by the general formula:

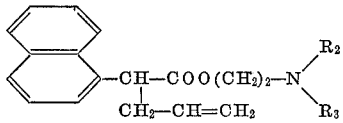

in which $R_2$ and $R_3$ are lower alkyl radicals.

The new compounds can be obtained according to the invention by condensation of an acid of the formula

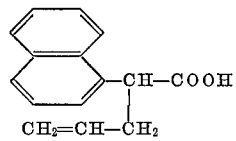

with an amino derivative of the formula

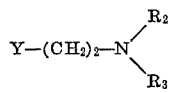

in which Y is a member of the group consisting of the halogens and the hydroxy radical, and $R_2$ and $R_3$ have the same meanings as above.

It is possible to prepare the new amino esters according to a preferred modification of the invention by azeotropic esterification, consisting in heating together under reflux the acid and the hydroxyl derivative in the presence of an entraining agent for the water of esterification.

The acids used as initial products in the preparation of the above amino esters are described in U.S. patent application Ser. No. 174,684 filed Feb. 21, 1962, now U.S. Patent No. 3,257,420.

The mineral and organic acid salts of the new compounds according to the invention, such as the salts of phosphoric, oxalic and fumaric acids, are obtained by neutralisation, and the quaternary ammonium derivatives by reaction of an alkyl halide, particularly methyl iodide, with the corresponding amino esters, which thus constitute intermediate derivatives in the preparation of their derivatives.

Used in the Magnus test on the isolated intestine of a guinea pig, the new compounds according to the invention have an antispasmodic activity which is 10 to 40 times better than that of papaverine.

In the form of an addition salt, these compounds have a peripheral and coronary vasodilatory action which is comparable in very advantageous manner to that of the best products so far employed in this indication.

On the other hand, it is to be observed that the local anaesthetic activity of these derivatives is likewise very high, and this may reach 5 to 10 times that of diethyl-aminodimethyl-2,6-acetanilide hydrochloride.

The processes for the preparation and the physical constants of various compounds which form the subject of the present invention are hereinafter described as non-limitative examples.

EXAMPLE 1

Acid oxalate of N-dimethylaminoethyl alpha-(1-naphthyl)-delta-pent-4-enoate $C_{21}H_{25}NO_6$

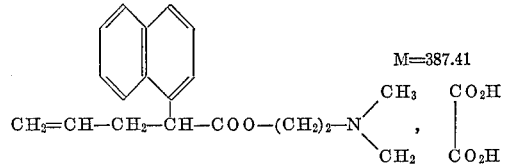

M=387.41

7 g. (0.0227 mol) of dimethylaminoethyl alpha-(1-naphthyl)-delta-pent-4-enoate, obtained for example by azeotropic esterification in toluene of alpha-(1-naphthyl)-delta-pent-4-enoic acid, are dissolved in 8 cc. of acetone and are caused to react with a solution of 2.97 g. (0.023 mol) of dihydrated oxalic acid in 8 cc. of acetone. As soon as the addition of the oxalic acid is completed, the expected salt precipitates.

7.6 g. of white solid are obtained, the yield being 80% (theoretical quantity=9.5 g.).

After having been recrystallised twice from a mixture of ethyl acetate and alcohol, the product is analytically pure and has the following constants:

Melting point—M.P.=164–165° C. (capillary tube), 157–159° C. (with capillarly tube in a Gallenkamp apparatus)
acidity index: calculated=289; found=286

*Gravimetric analysis.*—Calculated (percent): C, 65.10; H, 6.50; N, 3.61. Found (percent): C, 65.02; H, 6.62; N, 3.64.

EXAMPLE 2

Acid oxalate of N-diethylaminoethyl alpha-(1-naphthyl)-delta-pent-4-enoate $C_{23}H_{29}NO_4$

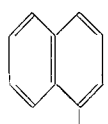

M = 415.46

$$CH_2=CH-CH_2-\overset{|}{C}H-COO-(CH_2)_2-N\overset{C_2H_5}{\underset{C_2H_5}{\diagdown}}, \quad \overset{CO_2H}{\underset{CO_2H}{|}}$$

5 g. (0.0152 mol) of N-diethylaminoethyl alpha-(1-naphthyl)-delta-pent-4-enoate, obtained for example by the action of belta-chloroethyl-N-diethylamine on alpha-(1-naphthyl)-delta-pent-4-enoic acid, are caused to react with 2 g. (0.0152 mol=1.93 g.) of dihydrated oxalic acid, under the conditions of Example 1.

5.5 g. of crystals are obtained with a melting point of 108–110° C. (capillary tube).

After being recrystallised three times from a mixture of ethyl acetate and alcohol, the product is analytically pure and has the following constants:

M.P.=122–124° C. (capillary tube)
acidity index: calculated=269; found=265

*Gravimetric analysis.*—Calculated (percent): C, 66.51; H, 7.63; N, 3.37. Found (percent): C, 65.92; H, 6.90; N, 3.36.

The compounds in accordance with the present investigation were tested to determine their antispasmodic and peripheral and coronary vasodilatory activity.

The antispasmodic activity of these compounds has been studied on the isolated intestine, and the spasms caused by barium chloride, to determine the papverinic activity of the product, as related to that of papverine, capable of arresting or increasing the movements induced in the isolated duodenum of a rat or the intestine of a guinea pig. The vasodilatory activity was determined by means of several methods, especially by means of the Langendorff apparatus which enables the coronary output of an isolated heart to be measured, e.g., that of a rabbit. The Langendorff coefficient represents the minimum dosage of the product causing the same output as $10^{-5}$ grams of papaverine, which is given the coefficient 100. The vasodilatory activity is also expressed by the femoral rotametric coefficient; and this coefficient is determined as above by measuring the blood output into the femoral artery of a dog; and in this case, the products were applied by intravenous injection, or by intra-arterial injection, and papaverine (1 mg. for intra-arterial and 25 mg. for intravenous injection) has the coefficient 100.

In the following table there are given the activities of different compounds according to the invention following the above tests and the papaverine activity is determined on the duodenum of a rat and the spasms are caused by $BaCl_2$; that the papaverinic activity under the same conditions is 100; and that the femoral rotametry is effected on a dog:

|  | Isolated intestine spasms by $BaCl_2$ | Femoral rotamentry | Langendorff |
| --- | --- | --- | --- |
| Oxalate acid of (naphthyl-1)pentene-delta-4-oate of N-diethylaminoethyl. | 200 | 87 | 37 |
| Oxalate acid of (naphthyl-1)pentene delta-4-oate of N-dimethylaminoethyl. | 330 | 270 | 66 |

It will be obvious to those skilled in the art that various changes may be made without departing from the scope of the invention and the invention is not to be considered limited to what is described in the specification.

What is claimed is:

1. An acid oxalate of a compound of the formula:

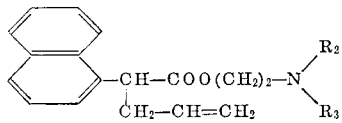

wherein $R_2$ and $R_3$ are lower alkyl radicals.

2. The acid oxalate of N-dimethylaminoethyl-α-(1-naphthyl)-delta-pent-4-enoate according to claim 1.

3. The acid oxalate of N-diethylaminoethyl-α-(1-naphthyl)-delta-pent-4-enoate according to claim 1.

References Cited

UNITED STATES PATENTS 3,257,420  6/1966  Szarvesi et al. _____ 260—347.4

FOREIGN PATENTS 1,289,597  3/1963  France.

CHARLES B. PARKER, Primary Examiner

E. J. GLEIMAN, Assistant Examiner

U.S. Cl. X.R.

260—515; 424—308

UNITED STATES PATENT OFFICE
CERTIFICATE OF CORRECTION

Patent No. 3,567,761  Dated March 2, 1971

Inventor(s) Etienne SZARVASI et al.

It is certified that error appears in the above-identified paten and that said Letters Patent are hereby corrected as shown below:

Col. 2, the formula at line 45,

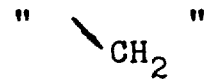

should be

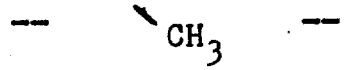

Signed and sealed this 6th day of July 1971.

(SEAL)
Attest:

EDWARD M. FLETCHER, JR.
Attesting Officer

WILLIAM E. SCHUY
Commissioner of